United States Patent
Miyamoto et al.

(10) Patent No.: US 10,773,206 B2
(45) Date of Patent: Sep. 15, 2020

(54) CO2 RECOVERY DEVICE AND CO2 RECOVERY METHOD

(71) Applicant: Mitsubishi Heavy Industries Engineering, Ltd., Kanagawa (JP)

(72) Inventors: Osamu Miyamoto, Houston, TX (US); Takashi Kamijo, Kanagawa (JP); Tatsuya Tsujiuchi, Tokyo (JP)

(73) Assignee: Mitsubishi Heavy Industries Engineering, Ltd., Kanagawa (JP)

( * ) Notice: Subject to any disclaimer, the term of this patent is extended or adjusted under 35 U.S.C. 154(b) by 0 days.

(21) Appl. No.: 16/156,042

(22) Filed: Oct. 10, 2018

(65) Prior Publication Data

US 2020/0114306 A1   Apr. 16, 2020

(51) Int. Cl.
*B01D 53/14*   (2006.01)

(52) U.S. Cl.
CPC ..... *B01D 53/1475* (2013.01); *B01D 53/1412* (2013.01); *B01D 53/1418* (2013.01); *B01D 53/1425* (2013.01)

(58) Field of Classification Search
CPC .............................................. B01D 53/14–18
See application file for complete search history.

(56) References Cited

U.S. PATENT DOCUMENTS

| | | | |
|---|---|---|---|
| 8,501,130 B1 | 8/2013 | Tsujiuchi et al. | |
| 2003/0045756 A1 | 3/2003 | Mimura et al. | |
| 2013/0259780 A1* | 10/2013 | Handagama | B01D 53/1418 423/220 |
| 2017/0291138 A1 | 10/2017 | Tanaka et al. | |
| 2018/0015409 A1* | 1/2018 | Cruz | B01D 53/1425 |

FOREIGN PATENT DOCUMENTS

| | | |
|---|---|---|
| JP | 2786560 B2 | 8/1998 |
| JP | 3969949 B2 | 9/2007 |
| JP | 4625478 B2 | 2/2011 |
| WO | 2016/072292 A1 | 5/2016 |

* cited by examiner

Primary Examiner — Cabrena Holecek
(74) Attorney, Agent, or Firm — Osha Liang LLP

(57) ABSTRACT

A $CO_2$ recovery apparatus includes: an absorption tower configured to remove $CO_2$ in an exhaust gas by contacting with a $CO_2$ absorption liquid containing an absorption agent; a regeneration tower for regenerating the $CO_2$ absorption liquid from the absorption tower; a reflux water drum for separating $CO_2$ gas released from the regeneration tower into $CO_2$ gas and condensed water; a first cleaning device installed in a gas-phase part of the regeneration tower and configured to remove the absorption agent contained in the $CO_2$ gas flowing through the gas-phase part, by using a first cleaning liquid containing at least the condensed water from the reflux water drum or a water obtained from the condensed water; and a control device configured to adjust a supply amount of the first cleaning liquid to the first cleaning device so that a concentration of the absorption agent in the condensed water is maintained to be not greater than a predetermined value.

7 Claims, 3 Drawing Sheets

CO2 RECOVERY DEVICE AND CO2 RECOVERY METHOD

TECHNICAL FIELD

The present disclosure relates to a $CO_2$ recovery apparatus and a $CO_2$ recovery method.

BACKGROUND ART

In recent years, vigorously studied is a method of recovering $CO_2$ in exhaust gas through gas-liquid contact between the exhaust gas and a $CO_2$ absorption liquid in a $CO_2$ recovery apparatus. The $CO_2$ absorption liquid after having absorbed $CO_2$ is supplied to an absorption liquid regeneration device, and is regenerated so as to be reusable as a $CO_2$ absorption liquid.

For instance, Patent Document 1 describes a $CO_2$ recovery system where a $CO_2$ absorption liquid after having absorbed $CO_2$ in exhaust gas in an absorption tower is regenerated.

In the $CO_2$ recovery system described in Patent Document 1, the $CO_2$ absorption liquid supplied from the absorption tower to a regeneration tower is heated by steam in the regeneration tower, and thereby releases gas containing $CO_2$, thus being regenerated. The gas released from the regeneration tower is separated into $CO_2$ gas and condensed water in a condensed-water distribution device (reflux water drum). The condensed water is partially utilized in the absorption tower as a part of cleaning water for removing, from exhaust gas deprived of $CO_2$, an absorption liquid that is entrained by the exhaust gas.

CITATION LIST

Patent Literature

Patent Document 1: U.S. Pat. No. 8,501,130B

SUMMARY

Meanwhile, condensed water from the reflux water drum is often used as a cleaning liquid for removing an absorption agent or the like that is entrained by gas in the absorption tower or the regeneration tower, and thus the concentration of the absorption agent in the condensed water should not be high.

On the other hand, depending on the supply destination and the supply amount of the condensed water as a cleaning liquid, especially when the generation amount of the condensed water decreases at a low-load time or the like, it may be necessary to supply water from outside. In this case, to maintain the water balance in the device, it becomes necessary to increase the evaporation amount of water in the device, which may lead to a decrease in the operation efficiency of the $CO_2$ recovery apparatus.

In view of the above, an embodiment of at least one embodiment of the present invention is to provide a $CO_2$ recovery apparatus and a $CO_2$ recovery method capable of improving the operation efficiency.

Solution to the Problems (1) According to at least one embodiment of the present invention, a $CO_2$ recovery apparatus includes: an absorption tower configured to remove $CO_2$ in an exhaust gas by contacting with a $CO_2$ absorption liquid containing an absorption agent; a regeneration tower for regenerating the $CO_2$ absorption liquid from the absorption tower; a reflux water drum for separating $CO_2$ gas released from the regeneration tower into $CO_2$ gas and condensed water; a first cleaning device installed in a gas-phase part of the regeneration tower and configured to remove the absorption agent entrained with the $CO_2$ gas from the lower part of the regeneration tower, by using a first cleaning liquid containing at least the condensed water from the reflux water drum or a water obtained from the condensed water; and a control device configured to adjust a supply amount of the first cleaning liquid to the first cleaning device so that a concentration of the absorption agent in the condensed water is maintained to be not greater than a predetermined value.

Since the condensed water from the reflux water drum is often used as a cleaning liquid for removing an absorption agent from a gas to be cleaned, the concentration of the absorption agent in the condensed water should not be high. Meanwhile, in the regeneration tower, heat for evaporating a liquid is required to maintain the liquid amount in the regeneration tower within an appropriate range. Thus, to reduce the heat quantity (e.g. steam) required to maintain the liquid amount inside the regeneration tower, the supply amount of the condensed water to be supplied to the cleaning device of the regeneration tower as the cleaning liquid should be minimized.

In this regard, with the above configuration (1), the supply amount of the first cleaning liquid containing the condensed water to the first cleaning device is adjusted so that the concentration of the absorption agent in the condensed water is maintained to be not greater than a predetermined value, and thus it is possible to reduce the supply amount of the first cleaning liquid to the first cleaning device (i.e. supply amount of the condensed water) while suppressing an increase in the concentration of the absorption agent in the first cleaning liquid supplied to the first cleaning device and reduce heat required to evaporate the liquid inside the regeneration tower. Thus, with the above configuration (1), it is possible to improve the operation efficiency of the $CO_2$ recovery apparatus.

Furthermore, when the condensed water in the reflux water drum is used as a cleaning liquid in the first cleaning device, the higher the concentration of the absorption agent in the condensed water, the higher the concentration of the absorption agent corresponding to the steam pressure contained in the gas containing $CO_2$ after cleaning. In this regard, with the above configuration (1), the concentration of the absorption agent in the condensed water is maintained to be not greater than a predetermined value, and thus it is possible to suppress an increase in the concentration of the absorption agent in the gas containing $CO_2$ after cleaning by the first cleaning device. As a result, it is possible to reduce the concentration of the absorption agent in the product $CO_2$ taken out from the gas-phase part of the reflux water drum.

(2) In some embodiments, in the above configuration (1), the $CO_2$ recovery apparatus further includes: a first supply line for supplying at least a part of the condensed water to the first cleaning device as the first cleaning liquid; and a first valve, installed in the first supply line, for adjusting a flow rate of the condensed water supplied to the first cleaning device from the first supply line. The control device is configured to adjust an opening degree of the first valve so that the concentration of the absorption agent in the condensed water is maintained to be not greater than a predetermined value.

With the above configuration (2), by adjusting the flow rate of the condensed water as the first cleaning liquid supplied to the first cleaning device through adjustment of the opening degree of the first valve, it is possible to maintain the concentration of the absorption agent in the condensed water to be not greater than a predetermined value.

Further, the opening degree of the above described first valve is adjusted so that the supply amount of the first cleaning liquid to the first cleaning device is minimized in a range that the concentration of the absorption agent in the condensed water is maintained to be not greater than a predetermined value, and thereby it is possible to reduce heat that is necessary in evaporation of the liquid in the regeneration tower.

Thus, with the above configuration (2), it is possible to improve the operation efficiency of the $CO_2$ recovery apparatus.

(3) In some embodiments, in the above configuration (1) or (2), the $CO_2$ recovery apparatus further includes: a second cleaning device installed in a gas-phase part of the absorption tower and configured to remove, by using a second cleaning liquid, the absorption agent contained in the exhaust gas after contacting with the $CO_2$ absorption liquid; a second supply line for supplying at least a part of the condensed water to the second cleaning device as the second cleaning liquid; and a second valve installed in the second supply line and configured to adjust a flow rate of the condensed water supplied to the second cleaning device. The control device is configured to adjust an opening degree of the second valve so that a liquid level of the reflux water drum is within a predetermined range.

With the above configuration (3), the supply amount of the condensed water to the second cleaning device is adjusted by adjusting the opening degree of the second valve so that the liquid level of the reflux water drum falls within a predetermined range, and thereby it is possible to adjust the water level of the reflux water drum appropriately while making effective use of the condensed water as the second cleaning water. Thus, it is possible to continue operation of the $CO_2$ recovery apparatus that is capable of improving the operation efficiency.

Furthermore, with the above configuration (3), the condensed water of the reflux water drum managed to have a concentration of the absorption agent that is not greater than a predetermined value is supplied to the second cleaning device as a cleaning liquid, and thus it is possible to maintain a low concentration of the absorption agent in exhaust gas after cleaning in the second cleaning device. Accordingly, it is possible to reduce the concentration of the absorption agent in exhaust gas discharged from the absorption tower.

(4) In some embodiments, in the above configuration (3), the $CO_2$ recovery apparatus further includes: a return line for returning a part of the second cleaning liquid stored in a liquid-phase storage device of the second cleaning device to the first cleaning device as the first cleaning liquid; and a return-amount adjustment valve, installed in the return line, for adjusting a flow rate of the second cleaning liquid returned to the first cleaning device from the return line. The control device is configured to adjust an opening degree of the return-amount adjustment valve so that the concentration of the absorption agent in the condensed water is maintained to be not greater than a predetermined value.

With the above configuration (4), by adjusting the flow rate of the second cleaning liquid as the first cleaning liquid returned to the first cleaning device through adjustment of the opening degree of the return-amount adjustment valve, it is possible to maintain the concentration of the absorption agent in the condensed water to be not greater than a predetermined value. Further, the opening degree of the above described return-amount adjustment valve is adjusted so that the supply amount of the first cleaning liquid to the first cleaning device is minimized in a range that the concentration of the absorption agent in the condensed water is maintained to be not greater than a predetermined value, it is possible to reduce heat that is necessary in evaporation of the liquid in the regeneration tower.

Thus, with the above configuration (4), it is possible to improve the operation efficiency of the $CO_2$ recovery apparatus.

(5) In some embodiments, in the above configuration (4), the $CO_2$ recovery apparatus further includes: a third cleaning device installed at the upstream of the second cleaning device of the absorption tower, and configured to remove the absorption agent contained in the exhaust gas after contacting with the $CO_2$ absorption liquid by using a third cleaning liquid; a branch line for supplying a part of the second cleaning liquid in the return line to the third cleaning device as the third cleaning liquid; and a third valve, installed in the branch line, for adjusting a flow rate of the third cleaning liquid supplied to the third cleaning device from the branch line. The control device is configured to adjust an opening degree of the third valve so that a liquid level of the liquid-phase storage part of the second cleaning device is within a predetermined range.

With the above configuration (5), the supply amount of the third cleaning liquid to the third cleaning device is adjusted by adjusting the opening degree of the third valve so that the liquid level of the liquid-phase storage part of the second cleaning device falls within a predetermined range, and thereby it is possible to adjust the water level of the above described liquid-phase storage part appropriately while again making effective use of the second cleaning water used in cleaning in the second cleaning device. Thus, it is possible to operate the $CO_2$ recovery apparatus appropriately.

(6) In some embodiments, in any one of the above configurations (1) to (5), the $CO_2$ recovery apparatus further includes a sensor for detecting a characteristic value of the condensed water as an index of the concentration of the absorption agent in the condensed water. The control device is configured to adjust a supply amount of the first cleaning liquid to the first cleaning device, on the basis of a signal from the sensor.

With the above configuration (6), by obtaining the characteristic value of the condensed water, which is an index of the concentration of the absorption liquid in the condensed water, it is possible to adjust the supply amount of the first cleaning liquid to the first cleaning device appropriately on the basis of the characteristic value by the sensor.

(7) In some embodiments, in the above configuration (6), the sensor includes a pH meter configured to detect a pH of the condensed water as the index, an electric conductivity meter configured to detect an electric conductivity of the condensed water as the index, or a specific resistance meter configured to detect a specific resistance of the condensed water as the index.

With the above configuration (7), as described in the above (1), it is possible to improve the operation efficiency of the $CO_2$ recovery apparatus through a simple configuration using a sensor such as a pH meter, an electric conductivity meter, or a specific resistance meter.

(8) According to at least one embodiment of the present invention, a $CO_2$ recovery method includes: removing $CO_2$ in an exhaust gas by contacting with a $CO_2$ absorption liquid containing an absorption agent; supplying the $CO_2$ absorption liquid from the absorption tower to a regeneration tower, and regenerating the $CO_2$ absorption liquid in the regeneration tower; supplying $CO_2$ gas released from the regeneration tower to a reflux water drum, and separating the $CO_2$ gas into $CO_2$ gas and condensed water in the reflux water drum; supplying the first cleaning device installed in a gas-phase part of the regeneration tower with a first cleaning liquid containing at least the condensed water from the reflux water drum or a water obtained from the condensed water, and removing the absorption agent contained in the $CO_2$ gas flowing through the gas-phase part; and adjusting a supply amount of the first cleaning liquid to the first cleaning device so that a concentration of the absorption agent in the condensed water is maintained to be not greater than a predetermined value.

According to the above method (8), the supply amount of the first cleaning liquid containing the condensed water to the first cleaning device is adjusted so that the concentration of the absorption agent in the condensed water is maintained to be not greater than a predetermined value, and thus it is possible to reduce the supply amount of the first cleaning liquid to the first cleaning device (i.e. supply amount of the condensed water) while suppressing an increase in the concentration of the absorption agent in the first cleaning liquid supplied to the first cleaning device and reduce heat required to evaporate liquid inside the regeneration tower. Thus, according to the above method (8), it is possible to improve the efficiency of $CO_2$ recovery.

Furthermore, according to the above described method (8), the concentration of the absorption agent in the condensed water is maintained to be not greater than a predetermined value, and thus it is possible to suppress an increase in the concentration of the absorption agent in the gas containing $CO_2$ after cleaning by the first cleaning device. As a result, it is possible to reduce the concentration of the absorption agent in the product $CO_2$ taken out from the gas-phase part of the reflux water drum.

(9) In some embodiments, in the above method (8), the $CO_2$ recovery method further includes: supplying at least a part of the condensed water as the first cleaning liquid to the first cleaning device via a first supply line; and adjusting a flow rate of the condensed water to be supplied to the first cleaning device from the first supply line so that the concentration of the absorption agent in the condensed water is maintained to be not greater than a predetermined value.

According to the above method (9), by adjusting the flow rate of the condensed water as the first cleaning liquid supplied to the first cleaning device, it is possible to maintain the concentration of the absorption agent in the condensed water to be not greater than a predetermined value. Further, the supply amount is adjusted so that the supply amount of the first cleaning liquid to the first cleaning device is minimized in a range that the concentration of the absorption agent in the condensed water is maintained to be not greater than a predetermined value, it is possible to reduce heat that is necessary in evaporation of the liquid in the regeneration tower.

Thus, according to the above method (9), it is possible to improve the efficiency of $CO_2$ recovery.

(10) In some embodiments, in the above method (8) or (9), the $CO_2$ recovery method further includes: supplying a second cleaning liquid to a second cleaning device installed in a gas-phase part of the absorption tower, and removing the absorption agent contained in the exhaust gas after contact with the $CO_2$ absorption liquid; supplying at least a part of the condensed water as the second cleaning liquid to the second cleaning device via a second supply line; and adjusting a flow rate of the condensed water to be supplied to the second cleaning device so that a liquid level of the reflux water drum is within a predetermined range.

According to the above method (10), the supply amount of the condensed water to the second cleaning device is adjusted so that the liquid level of the reflux water drum falls within a predetermined range, and thereby it is possible to adjust the water level of the reflux water drum appropriately while making effective use of the condensed water as the second cleaning water. Thus, it is possible to continue efficient operation of the $CO_2$ recovery.

(11) In some embodiments, in the above method (10), the $CO_2$ recovery method further includes: returning a part of the second cleaning liquid stored in a liquid-phase storage part of the second cleaning device as the first cleaning liquid to the first cleaning device via a return line; and adjusting a flow rate of the second cleaning liquid returned to the first cleaning device from the return line so that the concentration of the absorption agent in the condensed water is maintained to be not greater than a predetermined value.

According to the above method (11), by adjusting the flow rate of the second cleaning liquid as the first cleaning liquid returned to the first cleaning device, it is possible to maintain the concentration of the absorption agent in the condensed water to be not greater than a predetermined value. Further, the supply amount is adjusted so that the supply amount of the first cleaning liquid to the first cleaning device is minimized in a range that the concentration of the absorption agent in the condensed water is maintained to be not greater than a predetermined value, and thereby it is possible to reduce heat that is necessary in evaporation of the liquid in the regeneration tower.

Thus, according to the above method (11), it is possible to improve the efficiency of $CO_2$ recovery.

(12) In some embodiments, in the above method (11), the $CO_2$ recovery method further includes: supplying a third cleaning liquid to a third cleaning device installed at the upstream of the second cleaning device with respect to a flow of the exhaust gas, inside a gas-phase part of the absorption tower, and removing the absorption agent contained in the exhaust gas after contact with the $CO_2$ absorption liquid; supplying a part of the second cleaning liquid in the return line as the third cleaning liquid to the third cleaning device via a branch line; and adjusting a flow rate of the third cleaning liquid supplied to the third cleaning device from the branch line so that a liquid level of the liquid-phase storage part of the second cleaning device is within a predetermined range.

According to the above method (12), the supply amount of the third cleaning liquid to the third cleaning device is adjusted so that the liquid level of the liquid-phase storage part of the second cleaning device falls within a predetermined range, and thereby it is possible to adjust the water level of the above described liquid-phase storage part appropriately while again making effective use of the second cleaning water used in cleaning in the second cleaning device. Thus, it is possible to recover $CO_2$ appropriately.

(13) In some embodiments, in any one of the above configurations (8) to (12), the $CO_2$ recovery method further includes detecting a characteristic value of the condensed water as an index of the concentration of the absorption agent in the condensed water. The step of adjusting the supply amount of the first cleaning liquid includes adjusting the supply amount of the first cleaning liquid to the first cleaning device on the basis of a detection result of the characteristic value in the step of detecting.

According to the above method (13), by obtaining the characteristic value of the condensed water, which is an index of the concentration of the absorption liquid in the condensed water, it is possible to adjust the supply amount of the first cleaning liquid to the first cleaning device appropriately on the basis of the characteristic value by the sensor.

(14) In some embodiments, in the above method (13), the step of detecting includes detecting a pH of the condensed water, an electric conductivity of the condensed water, or a specific resistance of the condensed water, as the index.

According to the above method (14), as described in the above (8), it is possible to improve the efficiency of the $CO_2$ recovery through a simple configuration using a sensor such as a pH meter, an electric conductivity meter, or a specific resistance meter.

According to at least one embodiment of the present invention, an object is to provide a $CO_2$ recovery apparatus and a $CO_2$ recovery method capable of improving the operation efficiency.

DETAILED DESCRIPTION

Embodiments of the present invention will now be described in detail with reference to the accompanying drawings. It is intended, however, that unless particularly identified, dimensions, materials, shapes, relative positions and the like of components described in the embodiments shall be interpreted as illustrative only and not intended to limit the scope of the present invention.

Figure 1:
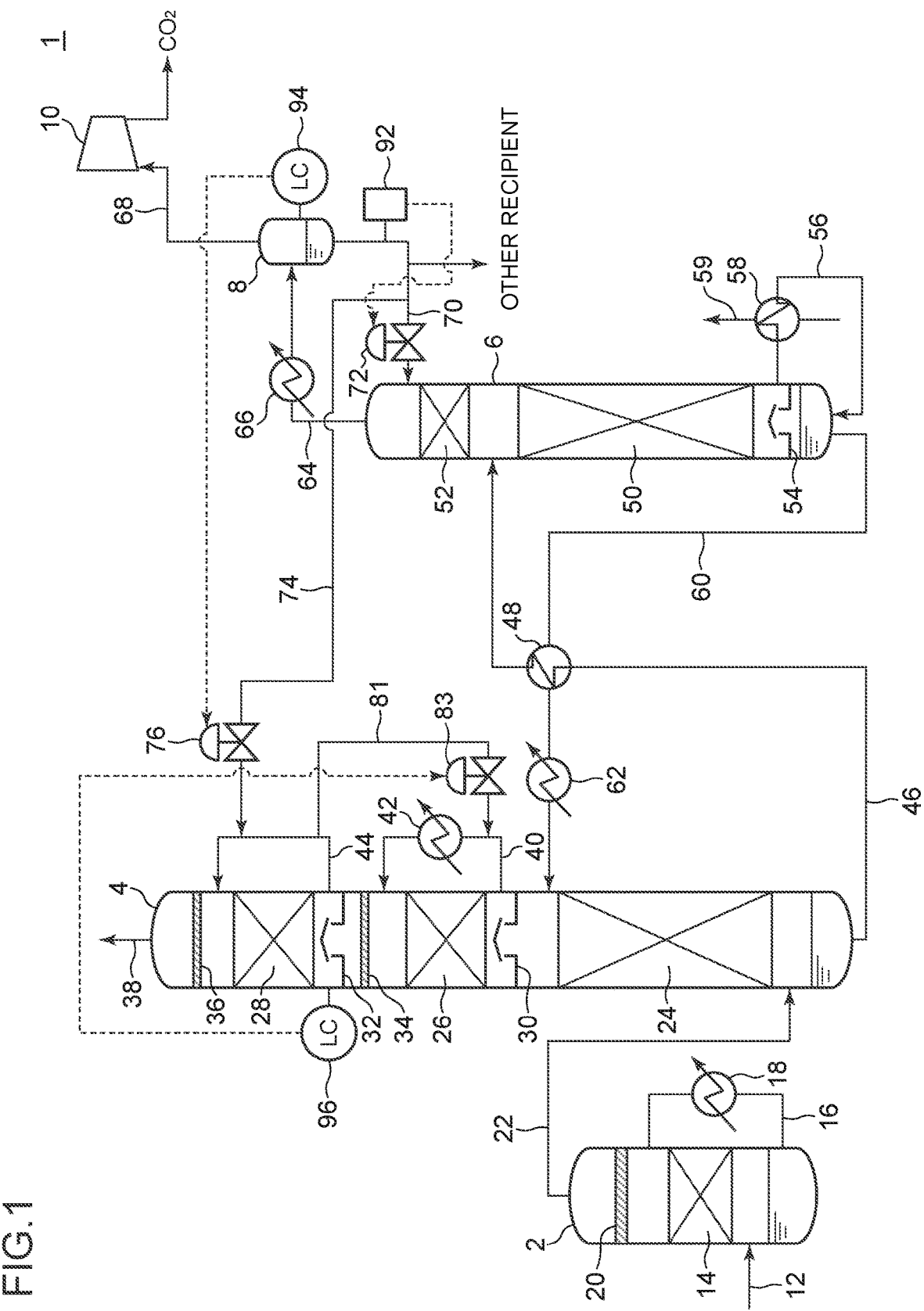
FIG. 1 is a schematic configuration diagram of a $CO_2$ recovery apparatus according to an embodiment.
Figure 2:
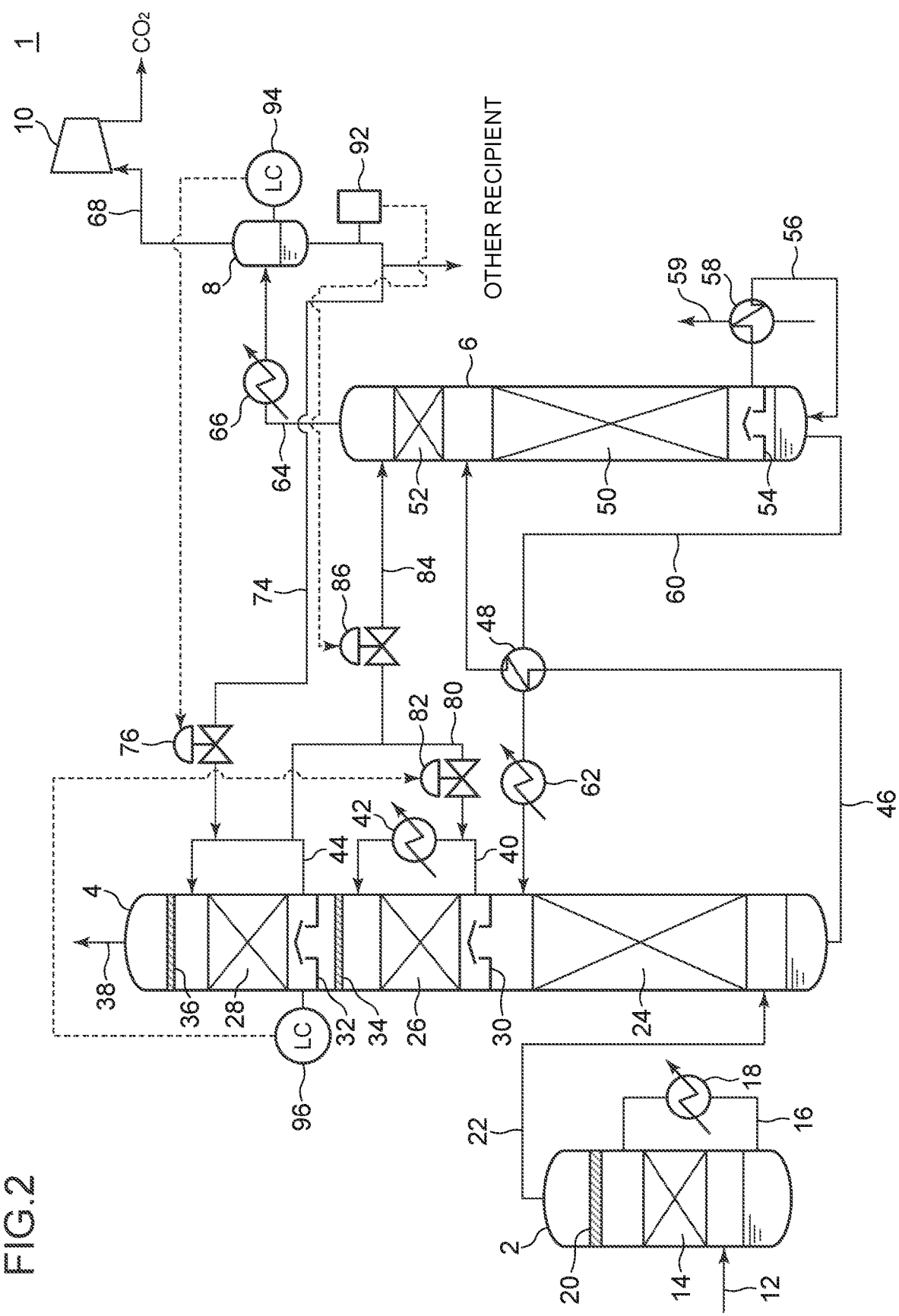
FIG. 2 is a schematic configuration diagram of a $CO_2$ recovery apparatus according to an embodiment.
Figure 3:
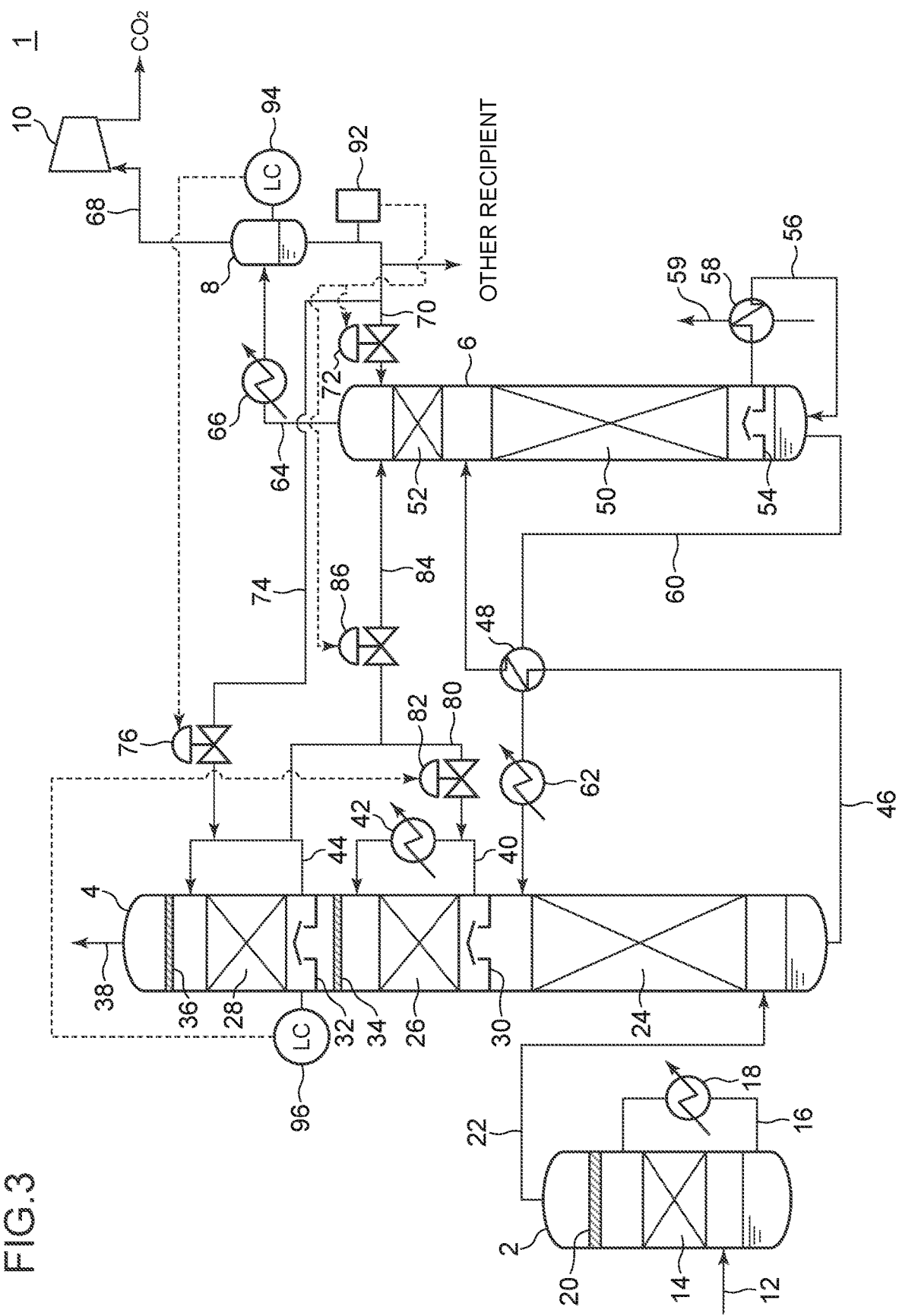
FIG. 3 is a schematic configuration diagram of a $CO_2$ recovery apparatus according to an embodiment.

FIGS. 1 to 3 are each a schematic configuration diagram of a $CO_2$ recovery apparatus according to an embodiment of the present invention. The $CO_2$ recovery apparatus 1 shown in FIGS. 1 to 3 is a device for recovering $CO_2$ from exhaust gas discharged from a power generation facility or a factory, for instance. As depicted in the drawings, the $CO_2$ recovery apparatus 1 includes a desulfurization tower 2 for pre-processing exhaust gas, an absorption tower 4 for causing an absorption liquid to absorb $CO_2$ in the exhaust gas, a regeneration tower 6 for regenerating the absorption liquid having absorbed $CO_2$, and a reflux water drum 8 configured to separate the released gas from the regeneration tower 6 into $CO_2$ gas and condensed water, and return the condensed water to the regeneration tower 6.

The desulfurization tower 2 includes a desulfurization part 14 for removing sulfur oxides in exhaust gas to be processed, a demister 20 for removing liquid droplets entrained by gas that flows upward through the desulfurization tower 2, a circulation line 16, and a cooler 18 installed in the circulation line 16.

The exhaust gas from a factory or the like is introduced into the desulfurization tower 2 via an exhaust gas introduction line 12. The exhaust gas introduced into the desulfurization tower 2 makes contact with a desulfurization absorption liquid in the desulfurization part 14 so that sulfates are removed from the exhaust gas, and the exhaust gas is cooled by a liquid cooled by the cooler 18. The demister 20 removes, from the exhaust gas having passed through the desulfurization part 14, liquid droplets entrained by the exhaust gas, and then the exhaust gas is discharged from the desulfurization tower 2 via a gas discharge line 22 installed on the tower top part of the desulfurization tower 2 and sent to the absorption tower 4.

The absorption tower 4 includes an absorption part 24 that absorbs $CO_2$ gas in the exhaust gas, cleaning devices 26, 28 that are installed above the absorption part 24 and that water-wash the exhaust gas from which $CO_2$ gas is removed, and demisters 34, 36 installed above the cleaning devices 26, 28 respectively, and that remove mist in the exhaust gas.

The absorption part 24 is supplied with an absorption liquid stored in the tower bottom part of the regeneration tower 6, via a lean liquid line 60. The exhaust gas flowing into the absorption tower 4 flows upward through the absorption tower 4 from the side of the tower bottom part of the absorption tower 4, flows into the absorption part 24, where the exhaust gas makes counter-current contact with the $CO_2$ absorption liquid supplied from above the absorption part 24.

The absorption part 24 is not particularly limited as long as it can promote gas-liquid contact between the $CO_2$ absorption liquid and the exhaust gas. For instance, the absorption part 24 may be formed by a packed layer packed with a packing material of a non-limited material, or may be formed by one or more stages of trays.

The type of the $CO_2$ absorption agent contained in the $CO_2$ absorption liquid is not particularly limited. For instance, alkanolamines such as monoethanolamine and diethanolamine, or various alkaline aqueous solutions other than amines such as sodium hydroxide, potassium hydroxide and calcium hydroxide can be used.

Due to the reaction in the absorption part 24, the $CO_2$ gas in the exhaust gas is absorbed by the $CO_2$ absorption liquid. For instance, in a case where an amine is used as the $CO_2$ absorption agent, the absorption reaction of $CO_2$ gas is represented by a reaction expression $R—NH_2+H_2O+CO_2 \rightarrow R—NH_3HCO_3$. As a result of the absorption reaction, most part of $CO_2$ gas is removed from the exhaust gas having passed through the absorption part 24.

The $CO_2$ absorption liquid having reacted with the $CO_2$ gas in the exhaust gas in the absorption part 24 falls onto the tower bottom part of the absorption tower 4, and is stored in the tower bottom part. The $CO_2$ absorption liquid stored in the tower bottom part of the absorption tower 4 is a rich absorption liquid having a higher $CO_2$ concentration than the $CO_2$ absorption liquid described below stored in the tower bottom part of the regeneration tower 6.

Meanwhile, exhaust gas deprived of $CO_2$ gas through contact with the $CO_2$ absorption liquid in the gas-liquid contact part 24 flows further upward through the absorption tower 4 toward the tower top part.

The exhaust gas after having passed through the absorption part 24 contains a $CO_2$ absorption agent, from the relationship of the saturated steam pressure at the temperature of the exhaust gas. Thus, to recover the $CO_2$ absorption agent contained in the exhaust gas after passing through the absorption part 24, the exhaust gas may be water-washed by the washing parts 24, 26 installed above the absorption part 24.

The cleaning devices 26, 28 include a second cleaning device 28 installed on the tower top side of the absorption tower 4, and a third cleaning device 26 installed below the second cleaning device 28 (i.e. at the upstream in the flow direction of exhaust gas). The second cleaning device 28 and the third cleaning device 26 are installed in the gas-phase part of the absorption tower 4 (i.e. installed above the tower bottom part where a liquid pool is formed in the absorption tower 4).

The second cleaning device 28 and the third cleaning device 26 are supplied with cleaning liquids (the second cleaning liquid and the third cleaning liquid, respectively) from above through the cleaning-liquid circulation lines 44, 40, respectively. The cleaning-liquid circulation lines 44, 40 may each include a circulation pump (not depicted) for circulating a cleaning liquid. Further, the cleaning-liquid circulation lines 44, 40 may each include a cooling part (e.g. the cooler 42 depicted in FIGS. 1 to 3) for cooling the cleaning liquid.

Chimney trays 32, 30 are installed below the second cleaning device 28 and the third cleaning device 26, respectively. While the chimney trays 30, 32 are configured to permit a gas to pass through from the bottom toward the top via the opening portion, a liquid is not let through from the top toward the bottom.

The exhaust gas that flows upward through the absorption tower 4 flows upward to the third cleaning device 26 via the opening portion of the chimney tray 30, after passing through the absorption part 24.

In the third cleaning device 26, the exhaust gas having flown upward makes gas-liquid contact with the third cleaning liquid supplied from the cleaning-liquid circulation line 40, and thereby the $CO_2$ absorption agent in the exhaust gas dissolves in the third cleaning liquid.

The third cleaning liquid after cleaning the exhaust gas at the third cleaning device 26 falls from the third cleaning device 26 and is stored in the chimney tray 30. The third cleaning liquid stored in the chimney tray 30 is circulated by the circulation pump via the cleaning-liquid circulation line 40, and is supplied again toward the third cleaning device 26 from above the third cleaning device 26.

The exhaust gas deprived of the $CO_2$ absorption agent in the third cleaning device 26 flows further upward through the absorption tower 4, and passes through the demister 34. The demister 34 captures mist in the exhaust gas.

After cleaning in the third cleaning device 26, most of the $CO_2$ gas absorption agent is removed from exhaust gas. The remaining $CO_2$ gas absorption agent in the exhaust gas after passing through the third cleaning device 26 is removed in the second cleaning device 28 installed above the third cleaning device 26.

The second cleaning device 28 removes the $CO_2$ gas absorption agent remaining in the exhaust gas from the second cleaning liquid supplied from above the second cleaning device 28.

Cleaning of exhaust gas in the second cleaning device 28 is similar to cleaning of exhaust gas in the third cleaning device 26, and thus not described again in detail.

The exhaust gas deprived of the $CO_2$ absorption agent in the second cleaning device 28 flows further upward through the absorption tower 4, and passes through the demister 36, where mist in the exhaust gas is captured. The exhaust gas deprived of mist is discharged outside from the tower top part 38 of the absorption tower 4.

Further, while the absorption tower 4 includes 23 stages cleaning devices including the second cleaning device 28 and the third cleaning device 26 in FIGS. 1 to 3, the absorption tower 4 may include a single-stage cleaning device, or three or more stages of cleaning devices.

In a case where the absorption tower 4 includes a plurality of stages of cleaning devices, of the plurality of cleaning devices, the cleaning device installed on the tower top side is the second cleaning device 28, and the cleaning device installed below the second cleaning device 28 (upstream of the exhaust gas flow) is the third cleaning device 26.

The rich absorption liquid stored in the tower bottom part of the absorption tower 4 is supplied to the regeneration tower 6 from the absorption tower 4 via a rich liquid line 46. Further, a feeding pump (not depicted) for feeding a rich liquid to the regeneration tower 6 from the tower bottom part of the absorption tower 4 may be installed in the rich liquid line 46. Further, as depicted in FIGS. 1 to 3, a heat exchanger 48 for exchanging heat between the rich absorption liquid flowing through the rich liquid line 46 and the lean absorption liquid flowing through the lean liquid line 60 may be installed in the rich liquid line 46. By heating the rich absorption liquid through heat exchange with the lean absorption liquid having a relatively high temperature, it is possible to promote regeneration of the absorption liquid in the regeneration tower 6 described below.

The regeneration tower 6 includes a release part 50 that releases $CO_2$ gas from the rich absorption liquid and a first cleaning device 52 which cleans the released $CO_2$ gas with reflux water.

The release part 50 includes a packing material, and is supplied with the rich absorption liquid from above through the rich liquid line 46.

The rich absorption liquid is heated by the saturated steam described below, in the release part 50, releases $CO_2$ gas, and becomes a lean absorption liquid which contains a relatively low rate of $CO_2$.

Below the release part 50, installed is a chimney tray 54 for receiving the lean absorption liquid.

The lean absorption liquid received by the chimney tray 54 is supplied through a re-boiler line 56, to a regeneration heater (re-boiler) 58 installed in the re-boiler line 56. The regeneration heater 58 includes a line 59 for supplying a heating medium (e.g. saturated steam) to the regeneration heater 58. The lean absorption liquid heated through heat exchange with the heating medium in the regeneration heater 58 at least partially changes in phase to the saturated steam, and is supplied to the lower section of the chimney tray 54 through the re-boiler line 56 in a gas-liquid phase mixed state. Accordingly, the saturated steam produced by the regeneration heater 58 flows upward through the regeneration tower 6 to the release part 50, via the chimney tray 54.

On the other hand, the lean absorption liquid supplied to the lower part of the chimney tray 54 via the re-boiler line 56 (lean absorption liquid that has not changed in phase in the regeneration heater 58) is stored in the tower bottom part of the regeneration tower 6. The lean absorption liquid stored in the tower bottom part is taken out from the tower bottom part of the regeneration tower 6 through the lean liquid line 60, and is supplied to the absorption part 24 of the absorption tower 4 by the feeding pump (not depicted) installed in the lean liquid line 60. The lean absorption liquid returned to the absorption tower 4 is reused as the above described $CO_2$ absorption liquid. Further, a cooler 62 for cooling the lean absorption liquid may be installed in the lean liquid line 60.

On the other hand, $CO_2$ gas released from the rich absorption liquid at the release part 50 flows toward the first cleaning device 52 installed above the release part 50 in the regeneration tower 6. In the first cleaning device 52, the above described $CO_2$ gas makes gas-liquid contact with the first cleaning liquid, and thereby the absorption agent is removed from the $CO_2$ gas.

The first cleaning device 52 is installed in the gas-phase part of the regeneration tower 6. That is, the first cleaning device 52 is installed above the tower bottom part where a liquid pool is formed in the regeneration tower 6.

The first cleaning device 52 is not particularly limited as long as it is capable of promoting gas-liquid contact between the above described $CO_2$ gas and the first cleaning liquid.

For instance, the first cleaning device 52 may include one or more stages of trays. In this case, the first cleaning liquid flows through each of the one or more stages of trays, and the first cleaning liquid may make gas-liquid contact with the $CO_2$ gas released from the release part 50 in each stage of the trays.

Alternatively, the first cleaning device 52 may include a packed layer, and the exhaust gas may make gas-liquid contact with the $CO_2$ absorption liquid in the packed layer.

The $CO_2$ gas after passing through the first cleaning device 52 is released from the tower top part of the regeneration tower 6, and is supplied to the $CO_2$ gas line 64. A condenser 66 is installed in the $CO_2$ gas line 64, and in the condenser 66, $CO_2$ gas is cooled and water vapor in the $CO_2$ gas is condensed.

The $CO_2$ gas after passing through the condenser 66 is supplied to the reflux water drum 8 installed on the outlet side of the $CO_2$ gas line 64.

The reflux water drum 8 is configured to separate released gas from the regeneration tower 6 ($CO_2$-gas) into $CO_2$ gas and condensed water.

The condensed water separated by the reflux water drum 8 is stored in the tower bottom part of the reflux water drum 8. As described below, the condensed water is supplied as the first cleaning liquid or the second cleaning liquid to the first cleaning device 52 of the regeneration tower 6 or the second cleaning device 28 of the absorption tower 4. Condensed water from the reflux water drum 8 may be fed to the first cleaning device 52 or the second cleaning device 28 by using a pump.

Further, a part of condensed water separated by the reflux water drum 8 may be supplied to a consumer other than the first cleaning device 52 and the second cleaning device 28. For instance, a part of the above described condensed water may be supplied to various circulation pumps as mechanical seal water, or alternatively, supplied to a reclaiming device for separating and removing depleted material accumulating in the absorption liquid as processing water.

On the other hand, $CO_2$ gas separated by the reflux water drum 8 is released from the reflux water drum 8 via a recovery line 68 connected to the tower top part of the reflux water drum 8, compressed by a compressor 10 installed in the recovery line 68, and is taken out of the system as product $CO_2$.

In an illustrative embodiment depicted in FIGS. 1 and 3, the $CO_2$ recovery apparatus 1 includes a first supply line 70 installed between the reflux water drum 8 and the regeneration tower 6, and is configured such that at least a part of condensed water from the reflux water drum 8 is supplied to the first cleaning device 52 as the first cleaning liquid via the first supply line 70.

Further, the first valve 72 is installed in the first supply line 70, and by adjusting the opening degree of the first valve 72, it is possible to adjust the flow rate of condensed water (first cleaning water) supplied to the first cleaning device 52 from the first supply line 70.

In an illustrative embodiment depicted in FIGS. 1 to 3, the $CO_2$ recovery apparatus 1 includes a second supply line 74 installed between the reflux water drum 8 and the absorption tower 4, and is configured such that at least a part of condensed water from the reflux water drum 8 is supplied to the second cleaning device 28 as the second cleaning liquid via the second supply line 74. In FIGS. 1 to 3, the second supply line 74 is connected to a cleaning-liquid circulation line 44 for supplying a cleaning liquid to the second cleaning device 28, and condensed water from the second supply line 74 is supplied to the second cleaning device 28 via the cleaning-liquid circulation line 44.

Further, the second valve 76 is installed in the second supply line 74, and by adjusting the opening degree of the second valve 76, it is possible to adjust the flow rate of condensed water (second cleaning liquid) supplied to the second cleaning device 28 from the second supply line 74.

In an illustrative embodiment depicted in FIGS. 2 and 3, the $CO_2$ recovery apparatus 1 includes a return line 84 installed between the absorption tower 4 and the regeneration tower 6, and is configured such that a part of the second cleaning liquid stored in the liquid-phase storage part (chimney tray 32) of the second cleaning device 28 is returned to the first cleaning device 52 as the first cleaning liquid via the return line 84. Further, the second cleaning liquid stored in the chimney tray 32 contains condensed water to be supplied to the second cleaning device 28 via the second supply line 94. Thus, the second cleaning liquid returned to the first cleaning device 52 via the return line 84 includes water derived from condensed water.

Further, a return-amount adjustment valve 86 is installed in the return line 84, and by adjusting the opening degree of the return-amount adjustment valve 86, it is possible to adjust the flow rate of the second cleaning liquid returned (supplied) to the first cleaning device 52 from the return line 84.

Further, in an illustrative embodiment depicted in FIGS. 2 and 3, the $CO_2$ recovery apparatus 1 includes a branch line 80 for supplying a part of the second cleaning liquid in the return line 84 to the third cleaning device 26 as the third cleaning liquid.

The third valve 82 is installed in the branch line 80, and by adjusting the opening degree of the third valve, it is possible to adjust the flow rate of the third cleaning liquid supplied to the third cleaning device 26 from the branch line 80.

Further, in an illustrative embodiment depicted in FIGS. 1 to 3, the second supply line 74 is connected to the cleaning-liquid circulation line 44, such that the second cleaning liquid is supplied to the second cleaning device 28 via the cleaning-liquid circulation line 44. In another embodiment, the second supply line 74 may supply the second cleaning device 28 with the second cleaning liquid not via the cleaning-liquid circulation line 44. For instance, the second supply line 74 may be connected to the absorption tower 4 directly, such that the second cleaning liquid from the second supply line 74 is directly supplied to the second cleaning device 28.

Furthermore, while the branch line 80 is installed so as to branch from the return line 84 in an illustrative embodiment depicted in FIGS. 2 and 3, in another embodiment, the return line 84 and the branch line 80 may be provided independently. For instance, the return line 84 may have an end connected to the absorption tower 4 and another end connected to the regeneration tower 6, and may be configured to return the second cleaning liquid stored in the liquid-phase storage part (chimney tray 32) of the absorption tower 4 to the first cleaning device 52 of the regeneration tower 6. In this case, the branch line 80 may be configured to supply the second cleaning liquid from the cleaning-liquid circulation line 44 to the cleaning-liquid circulation line 40.

Further, in an illustrative embodiment depicted in FIGS. 1 to 3, the $CO_2$ recovery apparatus 1 includes a sensor 92 for detecting the characteristic value of the condensed water separated by the reflux water drum 8, which is an index of concentration of the absorption agent in the condensed water. The sensor 92 is configured to send the detection result to a control device (not depicted) described below as an electrical signal.

The sensor 92 may include a pH meter configured to detect pH of condensed water as a concentration index of the absorption agent in the condensed water, an electric conductivity meter configured to detect electric conductivity of the condensed water as the above described index, or a specific resistance meter configured to detect specific resistance of the condensed water as the above described index.

Further, the higher the concentration of the absorption agent in the condensed water, the higher the pH and electric conductivity in the condensed water tend to be, and the smaller the specific resistance of the condensed water tends to be.

By using the above sensors, it is possible to determine the substantial concentration of the absorption agent in the condensed water readily and quickly, compared to measuring the concentration of the absorption agent in the condensed water. Thus, it is possible to control the valves quickly and appropriately on the basis of the concentration of the absorption agent in the condensed water as described below.

Further, while the sensor 92 is installed directly after the reflux water drum 8 in FIGS. 1 to 3, the installation position of the sensor 92 is not particularly limited to this. For instance, the sensor 92 may be installed in the first supply line 70 or the second supply line 74, or in the liquid-phase section of the reflux water drum 8.

Further, in an illustrative embodiment depicted in FIGS. 1 to 3, the reflux water drum 8 includes a liquid-level sensor 94 for detecting the liquid level of the reflux water drum 8.

Further, in an illustrative embodiment depicted in FIGS. 1 to 3, the absorption tower 4 includes a liquid-level sensor 96 for detecting the liquid level of the liquid-phase storage part (chimney tray 32) of the second cleaning device 28 of the absorption tower 4.

The liquid-level sensors 94, 96 may be configured to send the detection result to a control device (not depicted) described below as an electrical signal.

The $CO_2$ discovery device 1 having the above configuration further includes the first control device (not depicted) described below.

Further, the control devices (the first control device to the third control device) mentioned in the following description may be configured as separate control devices, or a single control device may be configured to be capable of performing the controls of the first to third control devices.

The above described device includes, for instance, a central processing unit (CPU), a random access memory (RAM), a read only memory (ROM), and a storage medium or the like that is readable with a computer. Further, the series of processes for realizing the various functions is stored in the storage medium or the like in the form of program, for instance. As the CPU reads the program out to the RAM or the like and executes processing and calculation of information, various functions are realized.

The first control device is configured to adjust the supply amount of the first cleaning liquid to the first cleaning device 52 so that the concentration of the absorption agent in the condensed water is maintained to be not greater than a predetermined value.

In the embodiment including the first supply line 70 and the first valve 72 (e.g. embodiment depicted in FIG. 1 or 3), the first control device is configured to adjust the supply amount of the first cleaning liquid to the first cleaning device 52 by adjusting the opening degree of the first valve 72 so that the index of the concentration of the absorption agent in the condensed water detected by the sensor 92 is maintained to be not greater than the predetermined value.

Further, in the embodiment including the return line 84 and the return-amount adjustment valve 86 (e.g. embodiment depicted in FIG. 2 or 3), the first control device is configured to adjust the supply amount of the second cleaning liquid to the first cleaning device 52 by adjusting the opening degree of the return-amount adjustment valve 86, so that the concentration of the absorption agent in the condensed water detected by the sensor 92 is maintained to be not greater than a predetermined value.

Furthermore, in the embodiment including both of the first supply line 70 and the first valve 72, and the return line 84 and the return-amount adjustment valve 86 (e.g. embodiment depicted in FIG. 3), the first control device may be configured to adjust the supply amount of the first cleaning liquid to the first cleaning device 52 by adjusting the opening degrees of the first valve 72 and the return-amount adjustment valve 86 so that the index of the concentration of the absorption agent in the condensed water detected by the sensor 92 is maintained to be not greater than the predetermined value.

Since the condensed water from the reflux water drum 8 is often used as a cleaning liquid for removing an absorption agent from a gas to be cleaned, the concentration of the absorption agent in the condensed water should not be high. Meanwhile, in the regeneration tower 6, heat for evaporating a liquid is required to maintain the liquid amount in the regeneration tower 6 within an appropriate range. Thus, to reduce the heat quantity (e.g. steam) required to maintain the liquid amount inside the regeneration tower 6, the supply amount of the condensed water to be supplied to the cleaning device of the regeneration tower as the cleaning liquid should be minimized.

In this regard, with the configuration including the above described first control device, the supply amount of the first cleaning liquid containing the condensed water to the first cleaning device 52 is adjusted so that the concentration of the absorption agent in the condensed water is maintained to be not greater than a predetermined value, and thus it is possible to reduce the supply amount of the first cleaning liquid to the first cleaning device 52 (i.e. supply amount of the condensed water) while suppressing an increase in the concentration of the absorption agent in the first cleaning liquid supplied to the first cleaning device 52 and reduce heat required to evaporate the liquid inside the regeneration tower 6 (the amount of steam to be supplied to the regeneration heater 58). Thus, it is possible to improve the operation efficiency of the $CO_2$ recovery apparatus 1.

Furthermore, when the condensed water in the reflux water drum 8 is used as a cleaning liquid in the first cleaning device 52, the higher the concentration of the absorption agent in the condensed water, the higher the concentration of the absorption agent corresponding to the steam pressure contained in the gas containing $CO_2$ after cleaning. In this regard, in the above described embodiment, the concentration of the absorption agent in the condensed water is maintained to be not greater than a predetermined value, and thus it is possible to suppress an increase in the concentration of the absorption agent in the gas containing $CO_2$ after cleaning by the first cleaning device 52. As a result, it is possible to reduce the concentration of the absorption agent in the product $CO_2$ taken out from the gas-phase part of the reflux water drum 8.

In some embodiments, the $CO_2$ recovery apparatus 1 may include the second control device (not depicted) configured to adjust the opening degree of the second valve 76 so that the liquid level of the reflux water drum 8 falls within a predetermined range.

For instance, in the embodiment depicted in FIGS. 1 to 3, the second control device may be configured to adjust the opening degree of the second valve 76 so that the detection value of the liquid-level sensor 94 installed on the reflux water drum 8 falls within a predetermined range.

In an embodiment including the above described second control device, the supply amount of the condensed water to the second cleaning device 28 is adjusted by adjusting the opening degree of the second valve 76 so that the liquid level of the reflux water drum 8 falls within a predetermined range, and thereby it is possible to adjust the water level of the reflux water drum 8 appropriately while making effective use of the condensed water as the second cleaning water. Thus, it is possible to continue efficient operation of the $CO_2$ recovery apparatus 1.

Further, in the absorption tower 4 including the second cleaning device 28, heat is not proactively given to evaporate the liquid inside the absorption tower 4. Thus, increasing the supply amount of the cleaning water to the second cleaning device 28 does not cause an increase in the heat quantity for maintaining the total water balance of the $CO_2$ recovery apparatus 1. Thus, according to the above described embodiment, by adjusting the supply amount of the condensed water to the second cleaning device 28, it is possible to adjust the water level of the condensed water drum effectively.

In some embodiments, the $CO_2$ recovery apparatus 1 may include the third control device (not depicted) configured to adjust the opening degree of the third valve 82 so that the liquid level of the liquid-phase storage part (chimney tray 32) of the second cleaning device 28 falls within a predetermined range.

For instance, in the embodiment depicted in FIGS. 2 and 3, the third control device may be configured to adjust the opening degree of the third valve 82 so that the detection value of the liquid-level sensor 96 for detecting the liquid level of the chimney tray 32 falls within a predetermined range.

In an embodiment including the above described third control device, the supply amount of the third cleaning liquid to the third cleaning device 26 is adjusted by adjusting the opening degree of the third valve 82 so that the liquid level of the liquid-phase storage part (chimney tray 32) of the second cleaning device 28 falls within a predetermined range, and thereby it is possible to adjust the water level of the above described liquid-phase storage part (chimney tray 32) appropriately while again making effective use of the second cleaning water used in cleaning in the second cleaning device 28. Thus, it is possible to operate the $CO_2$ recovery apparatus 1 appropriately.

Further, in an illustrative embodiment depicted in FIG. 1, a connection line 81 is installed between the cleaning-liquid circulation line 44 and the cleaning-liquid circulation line 40, such that a part of the cleaning liquid flowing through the cleaning-liquid circulation line 44 is supplied to the third cleaning device 26 as the third cleaning liquid via the connection line 81. Further, the valve 83 is installed in the connection line 81, and by adjusting the opening degree of the valve 83, and thereby it is possible to adjust the supply amount of the third cleaning liquid to the third cleaning device 26 via the connection line 81.

Further, the third control device may be configured to adjust the opening degree of the valve 83 so that the detection value of the liquid-level sensor 96 for detecting the liquid level of the chimney tray 32 falls within a predetermined range.

Also in this case, an effect similar to the above described effect can be achieved.

Further, in an illustrative embodiment depicted in FIG. 3, by adjusting the opening degrees of the first valve 72 and the return-amount adjustment valve 86, it is possible to switch the supply destination of the condensed water from the reflux water drum 8 between the first cleaning device 52 and the second cleaning device 28.

Further, by switching the supply destination of the condensed water as described above in accordance with the operation mode of the $CO_2$ recovery apparatus 1 (e.g. normal load operation mode and low load operation mode), it is possible to operate the $CO_2$ recovery apparatus 1 more efficiently.

Compared to the normal load operation mode, in the low load operation mode, the amount of product $CO_2$ taken out from the $CO_2$ recovery apparatus decreases. Accordingly, the exhaust gas supply amount to the $CO_2$ recovery apparatus 1, the absorption liquid amount circulating in the system, and the steam supplied to the regeneration heater 58 decreases, and the amount of moisture produced in the reflux water drum 8 also decreases.

Herein, as a comparison to the embodiment depicted in FIG. 3, in the embodiment depicted in FIG. 1, in the low-load operation mode, the condensed water produced in the reflux water drum 8 decreases, and thus the amount of condensed water that can be supplied to the first cleaning device 52 and the second cleaning device 28 also decreases.

Further, in a case where the condensed water is utilized as mechanical seal water of a pump or processing water of a re-claiming device, the supply amount of condensed water in these usages is substantially the same as that during normal operation even in low-load operation. Thus, the amount of condensed water that can be supplied as the cleaning liquid decreases even further.

In this case, supplying the condensed water with a limited amount that can be supplied as the cleaning liquid to both of the first cleaning device 52 and the second cleaning device 28 may cause shortage of the cleaning liquid amount in both of the cleaning devices. In this case, it is necessary to supply water from outside as a cleaning liquid, and the operation cost increases.

In contrast, in the embodiment depicted in FIG. 3, during normal operation, for instance, it is possible to operate the $CO_2$ recovery apparatus 1 efficiently by adjusting the opening degree of the first valve 72 in a range where the concentration of the absorption agent in the condensed water is not greater than a predetermined value while the return-amount adjustment valve 86 is fully closed, and adjusting the second valve 76 so that the liquid level of the liquid-phase storage part (chimney tray 32) of the second cleaning device 28 falls within a predetermined range.

Further, during low-load operation, by fully closing the first valve 72, the entire amount of the condensed water that can be utilized as a cleaning liquid is supplied to the second cleaning device 28 via the second supply line 74. Further, by adjusting the opening degree of the return-amount adjustment valve 86 within a range where the concentration of the absorption agent in the condensed water is not greater than a predetermined value, it is possible to supply a necessary and sufficient amount of the second cleaning liquid for cleaning the second cleaning device 28 to the first cleaning device 52 via the return line 84.

Accordingly, compared to a case of the embodiment depicted in FIG. 1 described above, it is possible to supply a great amount of cleaning water after all, to both of the first cleaning device 52 and the second cleaning device 28. Thus, it is possible to suppress shortage of cleaning water even during low-load operation, and suppress a cost increase due to water supply from outside. Thus, it is possible to further improve the operation efficiency of the $CO_2$ recovery apparatus 1.

Next, a method of recovering $CO_2$ according to some embodiments will be described.

The method of recovering $CO_2$ described below may be performed by using the above described $CO_2$ recovery apparatus 1.

The method of recovering $CO_2$ according to some embodiments includes a step (S1) of absorbing $CO_2$ in exhaust gas with a $CO_2$ absorption liquid that contains an absorption agent in the absorption tower 4, a step (S3) of supplying the $CO_2$ absorption liquid from the absorption tower 4 to the regeneration tower 6 and regenerating the $CO_2$ absorption liquid in the regeneration tower 6, a step (S5) of supplying $CO_2$-gas released from the regeneration tower 6 to the reflux water drum 8 and separating the $CO_2$-gas into $CO_2$ gas and condensed water in the reflux water drum 8, a step (S7) of supplying the first cleaning liquid containing at least condensed water from the reflux water drum 8 or water derived from the condensed water to the first cleaning device 52 installed in the gas-phase part of the regeneration tower 6, and removing the absorption agent contained in the $CO_2$-gas flowing through the gas-phase part, and a step (S9) of adjusting the supply amount of the first cleaning liquid to the first cleaning device 52 so that the concentration of the absorption agent in the condensed water is maintained to be not greater than a predetermined value.

According to the above described method, the supply amount of the first cleaning liquid containing the condensed water to the first cleaning device 52 is adjusted so that the concentration of the absorption agent in the condensed water is maintained to be not greater than a predetermined value, and thus it is possible to reduce the supply amount of the first cleaning liquid to the first cleaning device 52 (i.e. supply amount of the condensed water) while suppressing an increase in the concentration of the absorption agent in the first cleaning liquid supplied to the first cleaning device 52 and reduce heat required to evaporate the liquid inside the regeneration tower 6 (the amount of steam to be supplied to the regeneration heater 58). Thus, according to the above described method, it is possible to improve the efficiency of $CO_2$ recovery.

Furthermore, according to the above described method, the concentration of the absorption agent in the condensed water is maintained to be not greater than a predetermined value, and thus it is possible to suppress an increase in the concentration of the absorption agent in the gas containing $CO_2$ after cleaning by the first cleaning device 52. As a result, it is possible to reduce the concentration of the absorption agent in the product $CO_2$ taken out from the gas-phase part of the reflux water drum 8.

In the above described step S7, at least a part of the condensed water may be supplied to the first cleaning device 52 as the first cleaning liquid via the first supply line 70.

The step S9 may include adjusting the flow rate of the condensed water to be supplied to the first cleaning device 52 from the first supply line 70 so that the concentration of the absorption agent in the condensed water is maintained to be not greater than a predetermined value.

In some embodiments, the method may include a step (S11) of supplying the second cleaning liquid to the second cleaning device 28 installed inside the gas-phase part of the absorption tower 4 and removing the absorption agent contained in the exhaust gas after contact with the $CO_2$ absorption liquid, a step (S13) of supplying at least a part of the condensed water to the second cleaning device 28 via the second supply line 74, and a step (S15) of adjusting the flow rate of the condensed water to be supplied to the second cleaning device 28 so that the liquid level of the reflux water drum 8 falls within a predetermined range.

As described above, the supply amount of the condensed water to the second cleaning device 28 is adjusted so that the liquid level of the reflux water drum 8 falls within a predetermined range, and thereby it is possible to adjust the water level of the reflux water drum 8 appropriately while making effective use of the condensed water as the second cleaning water. Thus, it is possible to continuously perform reduction of the concentration of the absorption agent in product $CO_2$ and recovery of $CO_2$ which enables improvement of the operation efficiency.

Further, In the above described step S7, a part of the second cleaning liquid stored in the liquid-phase part (chimney tray 32) of the second cleaning device 28 may be returned to the first cleaning device 52 as the first cleaning liquid via the return line 84.

Further, the step S9 may include adjusting the flow rate of the second cleaning liquid to be returned to the first cleaning device 52 from the return line 84 so that the concentration of the absorption agent in the condensed water is maintained to be not greater than a predetermined value.

In some embodiments, the method may include a step (S17) of supplying the third cleaning liquid to the third cleaning device 26 installed at the upstream of the second cleaning device 28 with respect to the flow of exhaust gas, inside the gas-phase part of the absorption tower 4, and removing the absorption agent contained in the exhaust gas after contact with the $CO_2$ absorption liquid, a step (S19) of supplying at least a part of the second cleaning liquid in the return line 84 as the third cleaning liquid to the third cleaning device 26 via the branch line 80, and a step (S21) of adjusting the flow rate of the third cleaning liquid to be supplied to the third cleaning device 26 from the branch line 80 so that the liquid level of the liquid-phase storage part (chimney tray 32) of the second cleaning device 28 falls within a predetermined range.

Accordingly, the supply amount of the third cleaning liquid to the third cleaning device 26 is adjusted so that the liquid level of the liquid-phase storage part (chimney tray 32) of the second cleaning device 28 falls within a predetermined range, and thereby it is possible to adjust the water level of the above described liquid-phase storage part appropriately while again making effective use of the second cleaning water used in cleaning in the second cleaning device 28. Thus, it is possible to recover $CO_2$ appropriately.

In some embodiments, the method may include a step (S23) of detecting the characteristic value of the condensed water as an index of the concentration of the absorption agent in the condensed water.

Further, the step S9 of adjusting the supply amount of the first cleaning liquid may include adjusting the supply amount of the first cleaning liquid to the first cleaning device 52 on the basis of the detection result of the characteristic value in the detected step S23.

As described above by obtaining the characteristic value of the condensed water, which is an index of the concentration of the absorption liquid in the condensed water, it is possible to adjust the supply amount of the first cleaning liquid to the first cleaning device 52 appropriately on the basis of the detected characteristic value.

The above described step S23 may include detecting pH of the condensed water, electric conductivity of the condensed water, or specific resistance of the condensed water, as an index of the concentration of the absorption agent in the condensed water.

Accordingly, it is possible to improve the efficiency of $CO_2$ recovery through a simple configuration using a sensor such as a pH meter, an electric conductivity meter, or a specific resistance meter.

Embodiments of the present invention were described in detail above, but the present invention is not limited thereto, and various amendments and modifications may be implemented.

Further, in the present specification, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

DESCRIPTION OF REFERENCE NUMERALS

2 Desulfurization tower
4 Absorption tower
6 Regeneration tower
8 Reflux water drum
10 Compressor
12 Exhaust gas introduction line
14 Desulfurization part
16 Circulation line
18 Cooler
20 Demister
22 Gas discharge line
24 Absorption part
26 Third cleaning device
28 Second cleaning device
30 Chimney tray
32 Chimney tray
34 Demister
36 Demister
38 Tower top part
40 Cleaning-liquid circulation line
42 Cooler
44 Cleaning-liquid circulation line
46 Rich liquid line
48 Heat exchanger
50 Release part
52 First cleaning device
54 Chimney tray
56 Re-boiler line
58 Regeneration heater
59 Line
60 Lean liquid line
62 Cooler
64 $CO_2$ gas line
66 Condenser
68 Recovery line
70 First supply line
72 First valve
74 Second supply line
76 Second valve
80 Branch line
81 Connection line
82 Third valve
83 Valve
84 Return line
86 Return-amount adjustment valve
92 Sensor
94 Liquid-level sensor
96 Liquid-level sensor

The invention claimed is:

1. A $CO_2$ recovery apparatus, comprising:
an absorption tower configured to remove $CO_2$ in an exhaust gas by contacting with a $CO_2$ absorption liquid containing an absorption agent;
a regeneration tower for regenerating the $CO_2$ absorption liquid from the absorption tower;
a reflux water drum for separating $CO_2$ gas released from the regeneration tower into $CO_2$ gas and condensed water;
a first cleaning device installed in a gas-phase part of the regeneration tower and configured to remove the absorption agent entrained with the $CO_2$ gas from the lower part of the regeneration tower, by using a first cleaning liquid containing at least the condensed water from the reflux water drum or a water obtained from the condensed water;
a $CO_2$ gas line for directing the $CO_2$ gas from the regeneration tower to the reflux water drum;
a first supply line for supplying at least a part of the condensed water to the first cleaning device as the first cleaning liquid, the first supply line being provided without any branch line fluidically connected to the $CO_2$ gas line such that the first supply line is independent of the $CO_2$ gas line; and
a control device configured to adjust a supply amount of the first cleaning liquid to the first cleaning device via the first supply line so that a concentration of the absorption agent in the condensed water is maintained to be not greater than a predetermined value.

2. The $CO_2$ recovery apparatus according to claim 1, further comprising:
a first valve, installed in the first supply line, for adjusting a flow rate of the condensed water supplied to the first cleaning device from the first supply line,
wherein the control device is configured to adjust an opening degree of the first valve so that the concentration of the absorption agent in the condensed water is maintained to be not greater than a predetermined value.

3. The $CO_2$ recovery apparatus according to claim 1, further comprising:

a second cleaning device installed in a gas-phase part of the absorption tower and configured to remove, by using a second cleaning liquid, the absorption agent contained in the exhaust gas after contacting with the $CO_2$ absorption liquid;

a second supply line for supplying at least a part of the condensed water to the second cleaning device as the second cleaning liquid; and a second valve installed in the second supply line and configured to adjust a flow rate of the condensed water supplied to the second cleaning device, wherein the control device is configured to adjust an opening degree of the second valve so that a liquid level of the reflux water drum is within a predetermined range.

4. The $CO_2$ recovery apparatus according to claim 3, further comprising:

a return line for returning a part of the second cleaning liquid stored in a liquid-phase storage device of the second cleaning device to the first cleaning device as the first cleaning liquid; and a return-amount adjustment valve, installed in the return line, for adjusting a flow rate of the second cleaning liquid returned to the first cleaning device from the return line, wherein the control device is configured to adjust an opening degree of the return-amount adjustment valve so that the concentration of the absorption agent in the condensed water is maintained to be not greater than a predetermined value.

5. The $CO_2$ recovery apparatus according to claim 4, further comprising:

a third cleaning device installed at the upstream of the second cleaning device of the absorption tower, and configured to remove the absorption agent contained in the exhaust gas after contacting with the $CO_2$ absorption liquid by using a third cleaning liquid;

a branch line for supplying a part of the second cleaning liquid in the return line to the third cleaning device as the third cleaning liquid; and a third valve, installed in the branch line, for adjusting a flow rate of the third cleaning liquid supplied to the third cleaning device from the branch line, wherein the control device is configured to adjust an opening degree of the third valve so that a liquid level of the liquid-phase storage part of the second cleaning device is within a predetermined range.

6. The $CO_2$ recovery apparatus according to claim 1, further comprising a sensor for detecting a characteristic value of the condensed water as an index of the concentration of the absorption agent in the condensed water, wherein the control device is configured to adjust a supply amount of the first cleaning liquid to the first cleaning device, on the basis of a signal from the sensor.

7. The $CO_2$ recovery apparatus according to claim 6, wherein the sensor includes a pH meter configured to detect a pH of the condensed water as the index, an electric conductivity meter configured to detect an electric conductivity of the condensed water as the index, or a specific resistance meter configured to detect a specific resistance of the condensed water as the index.

* * * * *